United States Patent
Karnemaat

[15] 3,655,395
[45] Apr. 11, 1972

[54] PROCESS FOR TREATING WASTE MATERIALS

[72] Inventor: John N. Karnemaat, 1304 West Maple St, Kalamazoo, Mich. 49001

[22] Filed: Jan. 10, 1969

[21] Appl. No.: 790,475

[52] U.S. Cl. .................................99/2 R, 71/28, 210/59
[51] Int. Cl. ....................A23k 1/22, C05c 9/00, C02b 1/18
[58] Field of Search..................99/2 R; 71/28, 30; 210/54, 210/50, 51, 52, 59, 60, 63, 59 IW; 260/69 B, 71 R

[56] References Cited

UNITED STATES PATENTS

| | | | |
|---|---|---|---|
| 2,415,705 | 2/1947 | Rohner et al. | 71/28 |
| 2,714,553 | 8/1955 | Bibb et al. | 71/28 X |
| 3,073,693 | 1/1963 | Nielsson et al. | 71/30 X |
| 3,142,638 | 7/1964 | Blaisdell et al. | 210/54 X |
| 3,226,318 | 12/1965 | Schick | 210/10 |

Primary Examiner—Norman Yudkoff
Assistant Examiner—Kenneth Van Wyck
Attorney—Woodhams, Blanchard and Flynn

[57] ABSTRACT

A process for treating odiferous industrial and municipal waste materials by adding formaldehyde, nitric acid and urea to the waste materials in sequence in order to obtain an economically desirable product.

6 Claims, No Drawings

PROCESS FOR TREATING WASTE MATERIALS

This invention relates to a process for treating industrial and municipal waste materials in order to reduce the odor thereof and/or in order to economically recover therefrom the solid constituents thereof in a form in which said constituents can be used for various commercially valuable purposes.

The industrial and municipal waste materials that can be treated in accordance with the process of the present invention include the following:

1. Waste materials from pharmaceutical preparation procedures, such as the waste materials from microbiological fermentation processes.
2. Waste materials from paper mills, including deinking wastes and the like.
3. Waste materials from municipal waste treatment plants, such as sewage sludge from secondary waste treatment plants and the like.
4. Waste materials from other industrial processes including cannery wastes and the like.

Such waste materials may be comprised of from about 25 to 95 percent by weight, or more, of water and the remainder is comprised of solids, which may be either suspended or dissolved in water. Such waste materials usually contain substantial quantities of organic materials, including cellulose, plus other constituents such as trace amounts of metals, inorganic materials such as filter aids, clay and other materials.

Such industrial and municipal waste materials are produced in extremely large quantities. The disposal of such waste materials is an ever-increasing burden to industry and municipalities. Moreover, such wastes are commonly discharged, usually after treatment, into open lagoons or rivers and streams and they contribute significantly to the prevalent water pollution problem. Many of these waste materials have highly unpleasant odors. Although a wide variety of procedures have been devised in order to treat such waste materials, such techniques are either undesirably expensive or they are not sufficiently effective. Thus, there exists a need for a relatively simple and inexpensive procedure for effectively treating such waste materials.

Accordingly, it is an object of this invention to provide a process for stopping bacterial action in such waste materials in order to reduce the odor thereof and/or to economically recover therefrom solid materials in a form in which they can be easily converted to various commercially valuable products.

The drawing is a schematic flow diagram of the process of the invention.

According to the invention, there is provided a process for treating waste materials containing relatively high amounts of solids, such as up to 60 percent by weight, or more, of solids, which process comprises the steps of:

1. Mixing the waste materials with formaldehyde to kill the bacteria and to allow the reducing properties of the formaldehyde to react with materials in the waste.
2. Then cautiously adding concentrated nitric acid and mixing same with the waste materials and formaldehyde in order to form a substantially homogeneous mixture, allowing time for the reduction of the nitric acid into fuming nitric, and for the oxidizing properties of the volatile $NO_2$ and other oxides to react with materials in the waste, and
3. Then adding urea to the homogeneous mixture and mixing same therein.

A period of polymerization — agglomeration then occurs. The waste materials are thereby precipitated or agglomerated into a form in which they can be treated in any one of numerous manners, such as recovering of constituents for sale or reuse, use in recycling techniques, or the design of new products. The solids can, if desired, be disposed of by conventional land-fill techniques. However, because they contain relatively large amounts of nitrogen and other valuable constituents, they can be used to make various useful products, such as animal feed supplements or fertilizers, or they can be further treated, as by ion exchange techniques, various chemical reactions and/or screening techniques, in order to recover various ones of the useful constituents thereof.

Many industrial waste materials, such as microbiological fermentation wastes, paper mill wastes, etc. contain relatively high amounts of solids and they can be treated, as is, without any preliminary treatment. Other wastes may contain lesser amounts of solids. Because it is desired to carry out the process of the invention on materials having a relatively high solids concentration in order to reduce dilution of the chemicals, it will be advisable to preliminarily treat such materials to remove water therefrom. Such treatments can include centrifuging, for example, to remove the freely removable water. It is desired to carry out the process of the invention on materials having from about 10 percent to 70 percent solids. However, these are not precise operative limits but merely indicate the commercially desirable range. It should be noted that this process can be effectively carried out using concentrated sewer sludge solids from the Zimpro or other concentration techniques.

The formaldehyde used in the process of the invention is preferably in the form of conventional, commercially available solutions comprising about 37–44 percent by weight of formaldehyde in water. It is desired to minimize the amount of water added to the waste materials. Therefore, it is preferred to use as concentrated a formaldehyde solution as possible. The amount of formaldehyde added to the waste materials is selected taking into consideration the reducable nature and the biological activity of the constituents of the waste materials and the intended use of the separated solid product. Hence, the exact amount of formaldehyde added to the waste materials is subject to substantial variation. The amount of formaldehyde added should be sufficient so that there is an excess of formaldehyde remaining in the mixture after substantial reduction of the nitric acid has been accomplished. However, ordinarily at least about 10–30 percent by weight, based on the weight of the waste materials to be treated, of formaldehyde is added to the waste materials. It will not normally be necessary to add more than 100 percent by weight, based on the weight of the waste materials, of formaldehyde to the waste materials, unless it is desired to obtain a product consisting of essentially an inert urea formaldehyde resin. If such a product is desired, then a large excess of formaldehyde can be used and this can then be reacted with urea to obtain a product consisting primarily of a urea formaldehyde resinous product. In such case the other solids in the product, such as cellulose fibers, can be retained therein to serve as a filler or for increasing the flexural strength thereof.

The formaldehyde can be uniformly mixed with the waste materials in any convenient, conventional fashion, such as in a tank equipped with a stirrer or other type of agitating device. Further, although this step of the process of the invention can be carried out at ambient temperature, in order to speed up the reaction and increase the rate of the bacteriocidal and fungicidal functions of the formaldehyde, it will be advisable to heat the formaldehyde waste material mixture to an elevated temperature, such as about 80° C. The length of time of mixing is not critical.

The treatment of the waste materials with formaldehyde terminates all bacteriological life therein, effects rupture of many of the cells contained in the organic waste materials and also effects an intimate dispersion and homogenization of the solid materials and also reduces any reducible components of the waste.

Referring to the second step of the process, the nitric acid is preferably added in the form of a concentrated nitric acid solution, that is, a water solution containing 70–71 percent nitric acid, in order to minimize the amount of water added to the waste materials and to increase the rates of the variety of reduction-oxidation reactions which occur in the process. The nitric acid is added cautiously, for example, in a dropwise or other, slow, steadily metered fashion and it is uniformly mixed with the waste materials and the formaldehyde. This can be carried out, for example, in the same tank or container in which the formaldehyde was added to the waste materials, after completion of the addition of the formaldehyde and while still strongly agitating or stirring the contents of the container. The decomposition of the nitric acid is an exothermic reaction. The addition of the nitric acid causes a considerable quantity of gas to be evolved from the mixture. It is believed that nitrogen oxides are formed. Moreover, the nitric acid treatment also effects a further conditioning of the solid materials so that they are in an ideal form for undergoing the following steps of the process.

The mixture is allowed to stand while, if desired, removing heat therefrom as required in order to prevent excessive temperatures and the mixture is stirred until it is homogeneous. After the initial reaction, which may be rather violent, has been completed, then the mixture is allowed to stand with occasional agitation until the gas formation essentially stops. This time may range from 10 minutes on up, depending on nature of the waste material treated. Then the mixture can be treated in accordance with the following steps of the process according to the invention.

The amount of concentrated nitric acid solution used in the second step of the process also is variable depending on the characteristics of the waste material, the amount of formaldehyde used and the desired characteristics of the final solid product. The amount of nitric acid used must be sufficient so that the final homogeneous mixture at the completion of the nitric acid treatment step has a pH of from about 2 to 4. It has generally been found satisfactory to add from about 3 to about 10 percent by weight of nitric acid, based on the weight of the waste material treated in the process.

The urea treatment step of the process according to the invention is carried out be adding urea in a suitable granular form, such as in the form of commercially available urea prills (shotted), which are of relatively small particle size. Here again, the mixture to which the urea particles have been added is stirred until it is substantially homogeneous. The urea reacts with the residual formaldehyde in the mixture, in the presence of the nitric acid as a catalyst, in order to form a urea-formaldehyde condensation product. This polymer is believed to act as a binder or agglomerating agent with respect to the other solid materials contained in the mixture so that said solid materials are bound or adhered together.

The amount of urea added is interrelated to and is dependent on the amount of formaldehyde added in the first step of the process. There should be added sufficient urea so that there is no unreacted formaldehyde remaining in the solids after the condensation reaction has been completed. For this purpose, it will be preferable to add an excess of urea over and above that necessary to react with all of the formaldehyde remaining in the mixture. Further, the amount of urea added is selected so as to provide the desired chemical analysis of the final product, if the final product is to be used for a special purpose other than for mere disposal by land-fill techniques. For example, if the final solid product is to be used as a feed supplement, sufficient urea is added so that the nitrogen content of the final solid product is at the desired level. When the solid product is to be used as a nitrogen-rich fertilizer, sufficient urea can be added to give the desired amount of nitrogen in the final solid product. The content of the urea-formaldehyde condensation product in the final solids product obtained according to the process of the invention, therefore, can be adjusted by appropriate selection of the amount of formaldehyde and urea added during the steps of the process according to the invention.

The process according to the invention results in the formation of a moist solid product which can then be cured and dried in any convenient fashion, following which it can be pelleted, granulated or powdered, as desired or necessary.

The solid product obtained by treating an antibiotic fermentation waste by the process according to the invention may retain some antibiotic activity because the process according to the present invention may not appreciably alter the original antibiotic content of the antibiotic fermentation waste. Moreover, because it contains an appreciable quantity of nitrogen as amino acids, etc. and also because the majority of the nitrogen contained therein is subject to control by adjusting the amount of urea added, the solid product may have use in such a way as to utilize the remaining antibiotic or other pharmacologic activity such as a medicated feed supplement for feeding to animals.

The solid products obtained by treating a paper mill waste material by the process according to the invention will be comprised of cellulosic fibers, other constituents present in waste paper, such as clay and $TiO_2$, urea-formaldehyde condensation product and possibly some urea. This can be treated to recover its useful constituents or it can be used as it is, as a final product. For example, the urea and urea-formaldehyde condensation product can be removed and the remaining solids can then be thoroughly agitated and subdivided. They can then be screened through a screen, such as a 20-mesh screen, for example, in order to recover cellulose fibers therefrom. The remaining solids, which consist essentially of a powdery mixture of, for example, clay and $TiO_2$ can be recovered for use in a paper-making process. These solid materials will be obtained in the form of white bleached material so that they have high economic value. They also have a very large water retention characteristic.

The solid product, being rich in nitrogen, can be used as a fertilizer. It can be fortified by the addition of phosphorus supplying material and potassium — supplying material to provide balanced fertilizer compositions.

If the economics of the particular installation do not require or make commercially feasible the recovery of the solid materials, they can be disposed of by conventional land-fill techniques.

The process of the invention therefore reduces the odor of the waste materials and makes is possible, in many circumstances, to recover the solid materials in a form in which they can be used for various useful economic purposes. Further, the amount of equipment required and the operating costs involved in carrying out the process of the invention are relatively low. The process can be carried out on a batch or continuous basis. The process according to the invention uses relatively low cost, readily available materials and it enables the final solid product to be easily recovered in a condition in which it can be used for various useful purposes or it can be easily disposed of.

According to the invention, furthermore, there can be carried out a process according to which the sewer sludge product of a municipal waste treatment plant can be treated in order to essentially deodorize the waste material and to transform the suspended solids into a more dense form rendering them more easily separable by centrifuging, settling, etc. According to this process, the sewer sludge can be treated directly with a concentrated nitric acid solution, of the same type as described above, in order to precipitate suspended solids and at least a portion of the dissolved solids. These solids can settle or otherwise be separated or filtered from the liquid. The supernatant liquid can then, if desired, be neutralized with a further chemical, such as an alkali metal hydroxide, in order to form another precipitate which can then be separated from the liquid. Then the treated liquid can be discharged into a river or other body of water. This treatment effectively deodorizes the sewer sludge and, thus, overcomes a very serious problem which municipalities encounter in the operation of waste treatment plants. Further, this procedure removes a very substantial portion of the solids from the liquid in the sewer sludge so that the treated liquid discharged into the body of water has a lower B.O.D. and is otherwise less likely to cause pollution problems in the body of water.

The sewer sludge treated according to this embodiment of the invention can be the regular sewer sludge as obtained from a secondary waste treatment plant. It may consist, for example, of about 5 percent by weight solids and the rest is water and dissolved solids. However, it will be desirable to effect a preliminary concentration of the sewer sludge so as to remove the easily separable water therefrom. Such can be carried out, for example, by a low-speed centrifuging operation or a settling operation. A very substantial amount of the free liquid is removed and the remainder consists of a concentrated sewer sludge containing, for example, approximately 25 percent by weight solids.

The nitric acid can be added in the form of the concentrated nitric acid solution as discussed above. Further, it will be added in an amount from about 3 to about 5 percent based on the total weight of the sewage treated. The addition of the nitric acid will result in the same effects as described in connection with the principal embodiment of the invention and the same operating techniques can be used.

The precipitated solids resulting from the nitric acid treatment can then be removed from the remaining liquid by centrifuging, filtering or settling or similar techniques. These solids can be manipulated by the addition of further chemicals thereto so as to make same useful for animal feeds, fertilizers, road surfacing materials or other uses, depending upon the composition thereof. Further, they can be easily disposed of by land-fill operations. Moreover, they can be treated with formaldehyde and urea in order to form urea-formaldehyde condensation products therein in order that they may more easily form particles of controllable size range.

If desired, the liquid separated from the solids, after the nitric acid treatment, can be further treated with an alkaline material in order to precipitate additional solids therefrom which can also be disposed of. The remaining liquid can then be discharged into a river in a conventional fashion. Although the liquid discharged from the final step of the product into the river may not be completely free of objectionable materials, nevertheless, it is in a much better form than is the liquid discharged into rivers by conventional waste treatment plants and, therefore, the process according to the invention provides a substantial improvement as compared with present conventional techniques.

This embodiment of the invention is also characterized by the low cost of the equipment required in order to carry out the invention and by the low operating cost thereof. In particular, it can be carried out using relatively low cost, readily available nitric acid so that the operating costs are not excessive. Moreover, it permits the recovery of various useful materials which can be sold so as to offset a art of the cost of carrying out the process according to the invention. Moreover, it is now conventional, in situations where the product of a secondary waste treatment plant cannot be discharged directly into a river, to effect disposal thereof by burning or incinerating such a product. This involves large equipment costs and large heating costs. The process according to the present invention entirely eliminates this incinerating or digesting step and thus provides a further reduction in cost as compared with conventional techniques.

The invention shall be further described with reference to the following examples, it being understood that the invention is not limited to the details described in these examples.

EXAMPLE I

PROCESS FOR CONVERSION OF MICROBIOLOGICAL FERMENTATION WASTES

Starting Material
100 gm. Microbiological fermentation filter cake
  Volume: 175 ml.
  Total dry matter: 201 percent
  Nitrogen: 3.73 percent
  (dry weight)
Process
1. Added:
  40 grams formalin plus 10 grams of water (or enough to establish a thick slurry.)

Stirred from this point through entire process and conducted in hood with facilities for adequate removal of fumes.
Heated to 60°–80° C. Heat removed if necessary.

2. Added (cautiously): 5 ml. concentrated nitric acid.
  The temperature rose to about 90° C. When the temperature of the reaction mixture dropped to 60°–70°, the reaction(s) was complete, but an adequate amount of nitric acid remained to catalyze the polymerization step which followed. This step took 15–20 minutes.

3. Added: 75 grams prilled urea. Stirring continued 2–3 minutes, until all discrete particles were gone. The temperature dropped slightly, then rose slightly. Total volume at this point — approximately 175 ml. pH: 2.0 – 3.0. Total weight: 210 grams.

4. Dried at not more than 80° C. until moisture content was about 5 percent. Ground screened, pelletized, etc., in a manner to achieve desired produce size.

FINAL PRODUCT

| | |
|---|---|
| Weight of final product: | 110 gm. |
| Moisture: | 4.0% |
| Total nitrogen (N) : | 40.8% |
| Protein equivalent: | 255% |
| (=N×6.25) | |

This product is suitable for use as an animal feed supplement.

EXAMPLE II

PROCESS FOR UTILIZATION OF PAPER MILL WASTES

Starting Material:
100 grams of paper mill wastes.
Process:
1. Added 25 ml. formalin. Heat to 60°–80° C.
2. Added (cautiously) 5 ml. concentrated Nitric Acid, allowed to react 10 minutes, or until bubbling ceased.
3. Added 50 grams of prilled urea — stirred — dried to 3–5 percent moisture.

This material lends itself to fractionation and recovery of the basic ingredients by techniques such as differential solubilities, screening, density variations, etc.

This material also has certain properties which might be advantageous in the formation of new products without initial degredation. For example, the relatively high nitrogen content of the product coupled with moisture retaining qualities makes it suitable for use as an efficient soil conditioner. With humus and other fertilizer elements, including micronutrients, pesticides, etc., other specialty agricultural products can be designed. With the capability of adjusting the fiber content and the urea-formaldehyde resin polymer ratios, rigid and semirigid urea-formaldehyde resinous products can be obtained by increasing the amounts of formaldehyde and urea added.

EXAMPLE III

PROCESS FOR UTILIZATION OF ACTIVATED SEWAGE SOLIDS

Starting Material:
100 grams — centrifuged (or filtered) sewage solids.
  Volume: 110 ml.
  Total Dry Matter: 25 percent
  Nitrogen: 6.5 percent
Process:
1. Added 20 ml. formalin. Heated to 60°–80° C. Removed heat if necessary.
2. Added 7.0 ml. concentrated Nitric Acid (cautiously), allowed to react until bubbling ceased.
3. Added 50 grams prilled urea. Stirred — granulated — dried. This product also can be used as a fertilizer.

EXAMPLE IV

PROCESS FOR DEODORIZATION OF SEWAGE EFFLUENTS

Starting Material:
  100 grams of sewage sludge —
    Volume: 100 ml.
    Total Dry Matter: 4.0 percent
Process:
  1. Heated to 80° C.
  2. Added 7.0 ml. concentrated Nitric Acid — allowed to cool. (5 minutes)

The objectionable odor of the sewer sludge was eliminated by the time the nitric acid treatment was completed. The solid particles were removed by centrifuging and the effluent was in better condition for discharge into a river.

The embodiments of the invention in which an exclusive property or privilege is claimed are defined as follows:

1. A process for treating industrial and municipal waste materials comprising about 10–70 percent by weight of suspended and/or dissolved solids and the balance water, said solids being selected from the group consisting of organic waste materials, inorganic waste materials and mixtures thereof containing reducible components, which comprises the steps of:
  1. mixing the waste material with a concentrated aqueous formaldehyde solution free of urea in an amount of at least about 10 percent by weight of the waste material and sufficient to reduce chemically the reducible components of the waste material, the mixing being carried out for a period of time sufficient to cause the formaldehyde to reduce chemically the reducible components of the waste material and to effect an intimate dispersion and homogenization of the waste material; then
  2. slowly adding a concentrated aqueous nitric acid solution to the mixture free of urea and mixing same therein for a period of time sufficient to further homogenize the mixture and to form nitrogen oxide gas to react with the waste material, the amount of nitric acid added being from about 3 percent to about 10 percent by weight of the waste material and sufficient to result in the formation of a mixture having a pH of about 2–4;
  3. after formation of nitrogen oxide gas has stopped, then adding granular urea to the mixture in an amount at least sufficient to react with all the formaldehyde in the mixture and stirring it until the mixture is homogeneous in order to form urea-formaldehyde condensation products;
  4. and then drying the mixture to obtain a solid product.

2. A process according to claim 1, including during step (1), heating the mixture of the waste material and formaldehyde to a temperature of about 80° C.

3. A process according to claim 1, in which the nitric acid is added in the form of a concentrated nitric acid solution containing from about 70 to 71 percent nitric acid and the balance is water.

4. A process according to claim 1, in which the amount of urea added to the mixture is in excess of that required to react with all the formaldehyde in the mixture so that the final solid product contains unreacted urea therein.

5. A process according to claim 1, in which the amount of formaldehyde added to the organic waste material ranges from about 25 percent to at least about 100 percent, by weight, based on the weight of the waste material treated.

6. A process according to claim 1, in which the organic waste material is a paper mill waste and including the step of screening the dried solid product to separate cellulosic fibers from the remaining solid material in order to recover the cellulosic fibers and the remaining solid material separately.

* * * * *